Patented Sept. 15, 1953

2,652,389

UNITED STATES PATENT OFFICE 2,652,389

POLYAMIDE CONTAINING BETA CARBON-AMIDO - ALPHA - AMINOPROPIONIC ACID UNITS

Maynard S. Raasch and Charles W. Tullock, Wilmington, Del., assignors to E. I. du Pont de Nemours & Company, Wilmington, Del., a corporation of Delaware No Drawing. Application August 18, 1950, Serial No. 180,319

24 Claims. (Cl. 260—77.5)

This invention relates to new condensation polymers. More specifically, it relates to new alpha-amino acid polyamides.

Hitherto the many different types of alpha-amino acid polyamides and copolyamides thus far known to the art, for example the relatively high molecular weight film-forming alpha-amino acid copolyamide prepared by Woodward and Schramm [J. Am. Chem. Soc., 69, 1550 (1947)] and the high molecular weight alpha-amino acid copolyamides of unique solubility properties prepared by MacDonald (Serial No. 778,458, filed August 5, 1947) by copolymerizing the N-carboanhydrides of alpha-aminocarboxylic acids containing at least one hydrogen on the alpha-carbon are either highly water insoluble and water insensitive or else water soluble but extremely hygroscopic. Examples of the latter type of polyamides include those containing high proportions of combined N-substituted, i. e., alpha-secondary amino acid units. Such polyamides, although sufficiently water soluble to permit their use as silver halide binders in photographic film, are so hygroscopic, i. e., sensitive to water vapor, as to make the storage of films prepared therefrom impossible except under the most highly controlled conditions of dryness.

This invention has as an object the preparation of new alpha-monoaminomonocarboxylic acid polyamides. A further object is the preparation of nonhygroscopic but water soluble or at least water sensitive alpha-monoaminomonocarboxylic acid polyamides. Other objects will appear hereinafter.

These objects are accomplished by the invention of synthetic, optically inactive alpha-amino acid polyamides containing a plurality of combined alpha-carbonamidomethylglycine units, i. e., beta-carbonamido-alpha-aminopropionic acid units, which are surprisingly highly water soluble or water sensitive and at the same time nonhygroscopic. Included in the products of this invention are those polyamides containing combined beta-carbonamido-alpha-aminopropionic acid units wherein one valence of the extralinear amide nitrogen is utilized in forming the amide link and the remaining two valences are satisfied by hydrogen, or hydrocarbon radicals, e. g., alkyl, cycloalkyl, aryl, or aralkyl radicals. The extralinear amide nitrogens can also be members of a 5 to 7, and preferably 6, membered heterocycle in which case there can be other heteroatoms, i. e., oxygen, nitrogen or sulfur, in the heterocycle. Particularly preferred polyamides of this invention are those which contain, in addition to the above-described beta-carbonamido-alpha-aminopropionic acid units, combined beta-carboalkoxy- or carboaralkoxy- alpha-aminopropionic acid units.

The polyamides of this invention possess extralinear carbonamido and substituted carbonamido groups and are capable of ready modification through chemical reactions applied thereto. Such modifications, for instance, conversion of the extralinear carbonamido groups to nitrile groups and the controllable crosslinking of the polyamides through reaction of the extralinear carbonamido groups with formaldehyde or other methylol compounds are particularly efficacious in achieving many desired goals, for instance, modifying the organic solubilities of the polyamides.

The polyamides of this invention can be conveniently prepared by polymerizing the amide-forming derivatives of beta-carbamyl- and beta-substituted - carbamyl - alpha - aminopropionic acids with or without the amide-forming derivatives of other alpha-aminocarboxylic acids. The most convenient way of preparing the polyamides containing both combined beta-carbonamido- and substituted - beta - carbonamido-alpha-aminopropionic acid and beta-carboalkoxy or carboaralkoxy - alpha - aminopropionic acid units, is to polymerize the amide-forming derivatives of beta-carboalkoxy- or carboaralkoxy-alpha-aminopropionic acids with the amide-forming derivatives of other alpha-aminocarboxylic acids, preferably alpha - monoamino-monocarboxylic acids, if desired, and to react the thus formed polymer with ammonia or the requisite primary or secondary amine needed to convert the extralinear carboalkoxy or carboaralkoxy groups to the desired carbonamido or substituted-carbonamido groups. These ammonia and/or amine reactions can be conveniently carried out at room temperature or slightly higher, preferably in solution or dispersion in an inert, liquid reaction medium. Among the known amide-forming derivatives of the alpha-amino acids, including the beta-carboalkoxy- or carboaralkoxy-alpha-aminopropionic acids, it is preferred to use the N-carboanhydrides since they can conveniently be prepared in good yields from readily available materials and are capable of being easily polymerized with evolution of carbon dioxide to high molecular weight film- and fiber-forming alpha-amino acid polyamides.

The following examples in which the parts given are by weight are submitted to further illustrate this invention. As used in these examples, inherent viscosity, $\eta_{inh.}$, is defined by the following formula:

$$\eta_{inh.} = \frac{ln\, \eta_{rel.}}{C}$$

wherein $ln$ is the natural logarithm, $$\eta_{rel.} = \frac{\eta\; solution}{\eta\; solvent}$$

$\eta$ being viscosity and C is concentration of the solute in grams per 100 cc. of solution. The $\eta_{inh.}$ values given in the following examples, unless otherwise indicated, refer to results obtained with the polyamide involved dissolved in m-cresol at 25° C. at a concentration of 0.3 g./100 cc. of solution.

EXAMPLE I

*Part A.—Preparation of DL-beta-carbomethoxy-alpha-aminopropionic acid hydrochloride*

(Prepared according to the method of Pfeiffer and Christeleit, Z. physiol. Chem. 245, 205 (1937) for the preparation of L-aspartic acid monoethyl ester.)

A vigorous stream of gaseous hydrogen chloride is passed into a solution of 80 parts of DL-beta-carboxy-alpha-aminopropionic acid in 634 parts of reagent-grade methanol with stirring over a period of 33 minutes under anhydrous conditions. During this time the temperature of the reaction mixture rises from 25 to 53° C. At the end of this period, the mixture is cooled to 2° C. with an ice/water bath and dry hydrogen chloride again added with stirring for 20 minutes during which time the reaction mixture warms up to 5° C.; the ice bath is left in place during the second addition of the dry hydrogen chloride. The crude beta-carbomethoxy-alpha-aminopropionic acid hydrochloride is precipitated from the resulting clear solution by the addition of 3210 parts of anhydrous diethyl ether. The precipitate is removed by filtration and air dried. There is thus obtained 105 parts (95.5% yield) of DL-beta-carbomethoxy-alpha-aminopropionic acid hydrochloride. This hydrochloride is recrystallized by dissolving in 554 parts of reagent-grade methanol, adding 2565 parts of anhydrous diethyl ether, and cooling the resulting suspension at 3° C. overnight. The product is removed by filtration and after drying at 25° C. for several hours, there is finally obtained 66 parts (59.8% yield) of purified DL-beta-carbomethoxy-alpha-aminopropionic acid hydrochloride as white crystals melting at 193 to 194° C.

Analysis

Calculated for $C_5H_{10}NO_4Cl$: N, 7.63%.
Found: N, 7.53%.

*Part B.—Preparation of DL-beta-carbomethoxy-alpha-aminopropionic acid N-carboanhydride*

A suspension of 101 parts of the above DL-beta-carbomethoxy-alpha-aminopropionic acid hydrochloride in 1500 parts of purified, anhydrous dioxane in a reactor fitted with an efficient stirrer, a reflux water condenser, and a gas inlet tube connected to a source of gaseous phosgene and so placed that its lower extremity is just above the surface of the suspension is treated with gaseous phosgene for 75 minutes while maintaining the temperature of the reaction mixture between 70 and 81° C. at such a rate that an excess of phosgene is added. At the end of this time the reaction mixture is filtered to remove unreacted starting material (which amounts to 7.5 parts) and dioxane is removed from the filtrate by distillation under a pressure corresponding to 35–40 mm. of mercury using a water bath at 49–53° C. After approximately 95% of the dioxane has been removed, the remaining syrup is taken up in 26 additional parts of dioxane and again filtered to remove any small traces of DL-beta-carbomethoxy-alpha-aminopropionic acid hydrochloride and 321 parts of anhydrous diethyl ether added to the filtrate. About 5 parts of a brown syrup separates and is removed by filtration; 71 additional parts of diethyl ether are added and the mixture cooled in an ice water bath. On filtration there is thus obtained 64 parts (58.0% yield) of white crystalline DL-beta-carbomethoxy-alpha-aminopropionic acid N-carboanhydride·1/2 dioxane.

This product and those from two other similar runs are combined to give 229 parts of crude N-carboanhydride·1/2 dioxane adduct. Thus crude N-carboanhydride·1/2 dioxane adduct is recrystallized by dissolving in 775 parts of purified, anhydrous dioxane, adding 963 parts of anhydrous diethyl ether, rapidly filtering to remove the first crystals forming, which are slightly colored, cooling in an ice water bath and removing the resultant precipitate by suction filtration. After air drying, there is obtained 186 parts of once purified N-carboanhydride·1/2 dioxane adduct. This recrystallization is repeated and there is finally obtained 133 parts (58.0% recovery) of twice recrystallized DL-beta-carbomethoxy-alpha-aminopropionic acid N-carboanhydride·1/2 dioxane adduct as white needle crystals melting at 64 to 66° C. (inserted in bath at 50° C. and raised to temperature).

Analysis

Calculated for $C_8H_{11}O_6N$: C, 44.24%; H, 5.07%; N, 6.45%
Found: C, 44.44%; H, 5.32%; N, 6.49%

A 1.87 part sample of the above beta-carbomethoxy-alpha-aminopropionic acid N-carboanhydride·1/2 dioxane is dissolved in 131 parts of boiling anhydrous diethyl ether and the small amount of insoluble material removed by filtration. To the filtrate is added 66 parts of petroleum ether (boiling range 30–60° C.) and the resulting mixture cooled to room temperature. The solid that separates out is removed by filtration. There is thus obtained 0.6 part of crystalline material melting at 82–84° C. with decomposition (inserted in melting point bath at 50° C., and raised to temperature). Another sample of crystalline material similarly obtained melting at 83–85° C. with decomposition when inserted in the bath at 50° C. and raised to temperature is found by analysis to be the pure DL-beta-carbomethoxy-alpha-aminopropionic acid N-carboanhydride free of any dioxane or diethyl ether of crystallization.

Analysis

Calculated for $C_6H_7O_5N$: C, 41.62%; H, 4.05%; N, 8.09%
Found: C, 41.65%; H, 4.21%; N, 8.30%

*Part C.—Preparation of poly-DL-beta-carbomethoxy-alpha-aminopropionic acid by polymerization of the corresponding N-carboanhydride*

A solution of 37 parts of twice recrystallized DL-beta-carbomethoxy - alpha - aminopropionic acid N-carboanhydride·½ dioxane prepared as described above in 2590 parts of reagent-grade benzene is refluxed for 4.7 days under anhydrous conditions and 0.00865 part (0.0234 weight per cent and 0.0407 mole per cent based on the N-carboanhydride) of cyclohexylamine is added and refluxing at atmospheric pressure under anhydrous conditions continued for 2.2 days. During this time the polymer separates out of the polymerization mixture as a light, white, powdery precipitate, which exhibits an inherent viscosity of 0.56.

At the end of this time, the insoluble polyamide is removed from the polymerization mixture and dissolved in chloroform at a solids concentration of 6.3% by weight. The resultant, clear, viscous solution is flowed in a thin film onto a glass plate and the chloroform allowed to evaporate at room temperature. After further drying at 60° C. for two hours, there is obtained a clear, strong, tough, self-supporting film of the homopolyamide from DL-beta-carbomethoxy-alpha-aminopropionic acid which is soluble in tetrachloroethane, m-cresol, formic acid, and dimethylformamide. Samples of this film exhibit a tenacity of 11,150 lb./sq.in. and 3.2% elongation, a modulus of stiffness of $3.9 \times 10^5$ lb./sq.in., a pliability factor of 2.6, an average water absorption of 8.03% by weight when going from 0 to 100% relative humidity, and a melting point of 170–175° C. Samples of this film (approximately 6 mils thick), after being softened in water at 70° C., can be readily oriented. Extensions of 119 to 144% can be obtained by this treatment and such oriented films exhibit tenacities as high as 29,500 lb./sq.in. and elongations as high as 21%. Further samples of this homopolyamide similarly prepared of $\eta_{inh.}=.51$ when wet-spun from chloroform solution into a methanol coagulating bath yield a yarn of 40.9 denier, exhibiting tenacities as high as 0.6 gram per denier and elongations of 1.5%.

*Part D.—Preparation of a copolyamide from DL-beta-carbamyl-alpha-aminopropionic acid/ DL-beta - carbomethoxy - alpha - aminopropionic acid*

A two-part sample of a polyamide from DL-beta-carbomethoxy-alpha-aminopropionic acid (prepared as described above and of $\eta_{inh.}=0.28$) is suspended in 82 parts of liquid ammonia containing 0.5 part (25.0% on the basis of the polymer) of ammonium chloride catalyst in a Dewar flask for three days at room temperature. At the end of this time, the unreacted liquid ammonia is removed from the reaction mixture by evaporation at room temperature. The ammonium chloride is removed from the copolyamide residue by repeated water washings until a negative chloride test is obtained from the washings. Nitrogen analysis of the water-washed residue indicates the polyamide to contain 22.73% nitrogen. The theoretical value for complete conversion of all the extralinear carbomethoxy groups to carbamyl groups (i. e., a polyamide of molecular formula $C_4H_6N_2O_2$) is 24.60% nitrogen. These results indicate the product to be an 86/14 copolyamide from DL-beta-carbamyl-alpha-aminopropionic acid/DL-beta-carbomethoxy-alpha-aminopropionic acid. The copolyamide is clear and brittle in film form and is soluble in warm water and formic acid but insoluble in benzene, dioxane, methanol, acetone, ethyl acetate, dimethylformamide, chloroform and m-cresol, all solubilities being at steam-bath temperatures. The copolyamide exhibits an $\eta_{inh.}=0.53$ in formic acid at 25° C. at a concentration of 0.3 g. per 100 cc. of solution and softens when heated at 170° C. on a copper block and decomposes with gas evolution at 240° C.

A two-part sample of a polyamide from DL-beta-carbomethoxy-alpha-aminopropionic acid (prepared as described above and of $\eta_{inh.}=0.56$) is added portionwise over a period of 2 to 3 minutes to a gently stirred solution of 50 parts of water and 9 parts of aqueous ammonium hydroxide (28% ammonia) at room temperature. The resulting solution is allowed to stand for one hour at room temperature and is then filtered to remove small traces of impurities. The filtrate is poured in a thin film onto a glass plate and the water and unreacted ammonia allowed to evaporate at room temperature. A clear, self-supporting but brittle film of the copolyamide is thus obtained. Nitrogen analysis of samples of this film indicate the copolyamide to contain 21.16% nitrogen. The theoretical value for complete conversion of all the extralinear carbomethoxy groups to carbamyl groups (i. e., a polyamide of molecular formula $C_4H_6N_2O_2$) is 24.60% nitrogen. These results indicate the product to be a 75/25 copolyamide from DL-beta-carbamyl-alpha-aminopropionic acid/DL-beta-carbomethoxy-alpha-aminopropionic acid. The copolyamide is soluble in water and formic acid but insoluble (at steam bath temperatures) in chloroform, methanol, m-cresol, and dimethylformamide. The copolyamide exhibits inherent viscosities of 0.37 in formic acid, 0.54 in dischloroacetic acid, and 2.69 in water, all at a concentration of 0.3 g. of copolyamide per 100 cc. of solution at 25° C.

*Part E.—Reaction of a copolyamide from DL-beta-carbamyl-alpha-aminopropionic acid/ DL-beta-carbomethoxy - alpha - aminopropionic acid with formaldehyde*

A one-part sample of an 87/13 copolyamide from DL-beta-carbamyl-alpha-aminopropionic acid/DL-beta-carbomethoxy - alpha - aminopropionic acid (prepared in general as desscribed above in Example I, Part D and of $\eta_{inh.}=0.34$ in formic acid at a concentration of 0.3 g./100 cc. of solution at 25° C.) is dissolved in 6.1 parts of formic acid and 2.2 parts of 37% aqueous formaldehyde solution and the resulting mixture allowed to stand at 25° C. for five minutes with stirring. The clear gel so obtained is washed well with water and air dried. This copolyamide is soluble in hot water from which clear, tough films can be cast. After heating at 120° C. for two hours, the composition is no longer water soluble.

A one-part sample of the same 87/13 copolyamide is dissolved in 10 parts of water; 0.04 part of a 37% aqueous formaldehyde solution is added and the reaction mixture evaporated to dryness on a steam bath. A brittle, self-supporting film of the polymer product is obtained which is soluble in warm water and dichloroacetic acid. After heating at 120° C. for two hours, the sample is still water soluble.

EXAMPLE II

*Part A.—DL-beta-N,N-dimethylcarbamyl-alpha-aminopropionic acid/DL - beta-carbomethoxy-alpha-aminopropionic acid copolyamide*

A one-part sample of a polyamide from DL-beta-carbomethoxy - alpha - aminopropionic acid (prepared in general as described in Example I, Part C and of $\eta_{inh.}=0.51$) is dissolved in 8.5 parts of dimethylformamide and the solution allowed to stand at room temperature for 26 days under anhydrous conditions. At the end of this time the polymer solution is poured into an excess of anhydrous diethyl ether, and the polyamide which precipitates therefrom is removed by filtration and dried. Nitrogen analysis indicates this polymer to contain 12.47% nitrogen. The theoretical value for complete conversion of the extralinear carbomethoxy groups to N,N-dimethylcarbamyl groups (i. e., a polyamide of molecular formula $C_6H_{10}N_2O_2$) is 19.72% nitrogen. These results thus indicate the product to be an 18/82 copolyamide from DL-beta-N,N-dimethylcarbamyl-alpha-aminopropionic acid/DL-beta-carbomethoxy-alpha-aminopropionic acid. The copolyamide is insoluble in chloroform but soluble in formic and dichloroacetic acids, $\eta_{inh.}=0.47$ in formic acid.

Part B

A one-part sample of a polyamide from DL-beta-carbomethoxy-alpha-aminopropionic acid (prepared in general as described in Example I, Part C and of $\eta_{inh.}=0.56$) is dissolved in 23.7 parts of dimethylformamide and the reaction mixture allowed to stand at room temperature for 15 hours under anhydrous conditions. At the end of this time, the reaction mixture is heated to 82° C. for 1.5 hours. The clear solution is then poured into an excess of anhydrous diethyl ether, the resulting mixture allowed to stand at room temperature for 24 hours, and the solid product removed by filtration under anhydrous conditions. The solid copolyamide product is then dried at 95° C. in a vacuum oven for four hours. The resultant, white solid copolyamide is soluble in chloroform, from which solutions, clear, self-supporting films may be cast. Nitrogen analysis indicates the copolyamide product to contain 11.09% nitrogen. The theoretical value for complete conversion of the extralinear carbomethoxy groups to N,N-dimethylcarbamyl groups (i. e., a polyamide of molecular formula $C_6H_{10}N_2O_2$) is 19.72% nitrogen. The theoretical value for the starting DL-beta-carbomethoxy-alpha-aminopropionic acid polyamide is 10.85% nitrogen. These results thus indicate the product to be a 2.7/97.3 copolyamide from DL-beta-N,N - dimethylcarbamyl - alpha - aminopropionic acid/DL-beta-carbomethoxy - alpha - aminopropionic acid.

This copolyamide is surprisingly much more water sensitive than the starting DL-beta-carbomethoxy-alpha-aminopropionic acid polyamide. For instance, films of the starting homopolyamide, cast from chloroform solution, can be most readily lifted from the casting surface in film form by first being soaked in water. During this soaking process, no visible change occurs in the nature of the film nor is any change noticed after the film has been removed and dried.

On the other hand, films of the above 2.7/97.3 DL-beta - N,N-dimethylcarbamyl-alpha-aminopropionic acid/DL-beta-carbomethoxy-alpha-aminopropionic acid copolyamide cast from chloroform solution are softened so much by being soaked in water that it is impossible to remove the soaked material in film form. In fact, attempts to do so result in the formation of continuous filaments of the copolyamide. In other words, the film becomes so softened that under any applied stress, e. g., lifting, it loses its film shape and actually flows in response to the stress. Effectively, the water softened and swollen film of the copolyamide is spun into continuous filaments by such a process. These filaments upon drying retain their shape and dry as strong, self-supporting, continuous filaments. During the water soaking, films of this copolyamide in water soften and swell but also become noticeably opaque.

Part C

A ten-part sample of the same polyamide from DL-beta-carbomethoxy - alpha - aminopropionic acid used in Example II, Part A, is dissolved in 71.8 parts of dimethylammonium dimethylcarbamate, the resulting solution refluxed for two hours, and 20.5 parts additional dimethylammonium dimethylcarbamate added. The reaction mixture is then allowed to stand at room temperature for two days under anhydrous conditions, warmed for an additional four hours on a steam bath, and finally allowed to stand at room temperature for an additional day. At the end of this time the unreacted dimethylammonium dimethylcarbamate is removed from the reaction mixture by warming on a steam bath in a stream of air. The residue is washed with diethyl ether and warmed in a vacuum oven at 85° C. for four hours. The resulting polyamide residue is found by analysis to contain 18.06% nitrogen. The theoretical value for complete conversion of the extralinear carbomethoxy groups to N,N-dimethylcarbamyl groups (i. e., a polyamide of molecular formula $C_6H_{10}N_2O_2$) is 19.72% nitrogen. These results indicate that the polyamide product is an 81.3/18.7 copolyamide from DL-beta - N,N-dimethylcarbamyl - alpha-aminopropionic acid/DL-beta-carbomethoxy-alpha-aminopropionic acid. This copolyamide is soluble in water, 2–B alcohol, chloroform, formic acid, m-cresol and dimethylformamide. Clear, self-supporting films can be obtained by film casting from solutions in these solvents, for instance, from water. The copolyamide exhibits an $\eta_{inh.}=0.23$.

EXAMPLE III

*Part A.—DL-beta-N - n - butylcarbamyl - alpha-aminopropionic acid/DL-beta - carbomethoxy-alpha-aminopropionic acid copolyamide*

A two-part sample of a polyamide from DL-beta-carbomethoxy-alpha - aminopropionic acid (prepared in general as described above in Example I, Part C and of $\eta_{inh.}=0.49$) is suspended in a mixture of 7.4 parts of n-butylamine and 50 parts of water and stirred at room temperature for one hour. The water and unreacted n-butylamine are removed from the reaction mixture by evaporation at room temperature. The resulting polyamide is found by analysis to contain 14.68% nitrogen. The theoretical value for complete conversion of the extralinear carbomethoxy groups to N-n-butylcarbamyl groups (i. e., a polyamide of molecular formula $C_8H_{13}N_2O_2$) is 16.57% nitrogen. These results thus indicate the polyamide to be a 67/33 copolyamide from DL-beta-N-n-butylcarbamyl-alpha-aminopropionic acid/DL-beta - carbomethoxy-alpha-aminopropionic acid. The copolyamide is soluble in water, m-cresol, methanol, formic acid, and dimethylformamide.

Part B

To a solution of 10 parts of a polyamide from the DL - beta - carbomethoxy-alpha-aminopropionic acid (prepared as described above in Example I, Part C and of $\eta_{inh.}=0.56$) in 297.8 parts of chloroform is added 14.8 parts of n-butylamine. Some polymer precipitates during the addition of the amine and the mixture is warmed for 10 minutes at 40–50° C. to effect solution. The reaction mixture is allowed to stand at room temperature for 12 days, and the cloroform then removed by warming on a steam bath for three hours and finally in a vacuum oven at 85° C. for 4.5 hours. There is thus obtained 13 parts of a polyamide residue exhibiting an $\eta_{inh}$ of 0.11. Nitrogen analysis indicates the product to contain 15.32% nitrogen. The theoretical value for the complete conversion of the extralinear carbomethoxy groups to N-n-butylcarbamyl groups (i. e., a polyamide of molecular formula $C_8H_{13}N_2O_2$) is 16.57%. These results show that the product is an 80/20 copolyamide from DL-beta - N-n-butylcarbamyl-alpha-aminopropionic acid/DL - beta - carbomethoxy-alpha-aminopropionic acid.

EXAMPLE IV

*DL-beta-N,N-DI-n-butylcarbamyl-alpha-aminopropionic acid/DL-beta-carbomethoxy-alpha-aminopropionic acid copolyamide*

Ten parts of a polyamide from DL-beta-carbomethoxy-alpha-aminopropionic acid (prepared as described above in Example I, Part C and of $\eta_{inh}=0.52$) in 297.8 parts of chloroform is heated at the reflux with 23 parts of di-n-butylamine for 0.33 hours. The clear fluid solution is allowed to stand at room temperature for 22 days. The resulting gel is cut up, air dried, and warmed in a vacuum oven for five hours at 85° C. to remove any unreacted amine and chloroform. Nitrogen analysis of the approximately 10.5 parts of residue thereby obtained indicate this product to contain 12.07% nitrogen. The theoretical value for complete conversion of the extralinear carbomethoxy groups to N,N-di-n-butylcarbamyl groups (i. e., a polyamide of molecular formula $C_{12}H_{22}N_2O_2$) is 12.39% nitrogen. Thus, the product is shown to be a 79/21 copolyamide from DL-beta - N,N-di-n-butylcarbamyl-alpha-aminopropionic acid/DL - beta-carbomethoxy-alpha-aminopronpionic acid. This copolyamide is soluble in water, formic acid, m-cresol, dimethylformamide and methanol.

EXAMPLE V

*DL - beta-(4-morpholinecarbonyl)-alpha-aminopropionic acid/DL-beta-carbomethoxy-alpha-aminopropionic acid copolyamide*

A solution of 12 parts of a polyamide from DL-beta - carbomethoxy-alpha-aminopropionic acid (prepared in general as described in Example I, Part C and of $\eta_{inh}=0.41$) in 100 parts of morpholine is heated at 100° C. for one hour under anhydrous conditions. At the end of this time, the unreacted morpholine is removed by repeated diethyl ether washes until the morpholine ordor is gone and the product then air dried overnight. Analysis of the polyamide residue thereby obtained indicates the product to contain 13.85% nitrogen. The theoretical value for complete conversion of the extralinear carbomethoxy groups to morpholinecarbonyl groups (i. e., a polyamide of molecular formula $C_8H_{12}N_2O_3$) is 15.22% nitrogen. These results indicate the product to be a 67/33 copolyamide from DL-beta- (4 - morpholinecarbonyl)-alpha-aminopropionic acid/DL - beta - carbomethoxy-alpha-aminopropionic acid. This copolyamide exhibits an $\eta_{inh}$ of 0.21 and is soluble in chloroform, formic acid, m-cresol and dimethylformamide and softens on a copper block at 204° C. and slowly decomposes with browning at 270° C.

EXAMPLE VI

*Part A.—Reaction of the polyamide from DL-beta - carbomethoxy - alpha - aminopropionic acid with hexamethylenediamine*

A solution is prepared by dissolving 2 parts of a polyamide from DL-beta-carbomethoxy-alpha-aminopropionic acid (prepared as described above in Example I, Part C and of $\eta_{inh}=0.59$) in 59.6 parts of chloroform. 0.098 part of hexamethylenediamine (10.9% of the theoretical amount needed to react with all the extralinear carbomethoxy groups) are then added with 3.7 parts of chloroform and after thorough mixing, the solution is poured in a thin film onto a glass plate and the chloroform solvent allowed to evaporate at room temperature. The resulting film is then baked at 105° C. for 40 minutes. At the end of this time, solubility determinations indicate the resulting film to be no longer soluble in chloroform, thereby indicating the crosslinking effected through the reaction of the hexamethylenediamine with extralinear carbomethoxymethyl groups in neighboring polymer chains, i. e., the formation of hexamethylene-bis-carbonamidomethyl crosslinks between the polymer chains. The polymer is also insoluble at 100° C. in formic acid, dichloroacetic acid, m-cresol and dimethylformamide—in all of which solvents the starting polyamide is soluble.

Nitrogen analysis of this chloroform-insoluble copolyamide indicates the copolyamide to contain 11.06% nitrogen which corresponds to the conversion of 2.9% of the original extralinear carbomethoxymethyl groups in the starting polyamide to the above-described hexamethylene-bis-carbonamidomethyl crosslinks. Film samples of this polyamide exhibit an average tensile strength of 10,095 lb./sq. in., an average elongation of 2.71%, an average pliability figure of 1.80, and a decomposition temperature of 215° C.

An additional experiment carried out under the same conditions with further samples of the same batch of polyamide from DL-beta-carbomethoxy - alpha-aminopropionic acid varying only in that 0.0392 part of hexamethylenediamine is added (4.36% of the theoretical amount of hexamethylenediamine needed to react with all the extralinear carbomethoxy groups) produces a polyamide which is soluble in m-cresol at 100° C. but insoluble (at the same temperature) in chloroform, formic acid, dimethylformamide, and dichloroacetic acid—in all of which solvents the starting DL - beta - carbomethoxy - alpha-aminopropionic acid polyamide is soluble. Film samples of this polyamide exhibit an average tensile strength of 9522 lb./sq. in., an average elongation of 2.64%, an average pliability figure of 1.91, and soften at 165° C.

Nitrogen analysis carried out on the copolyamide product is not sufficiently accurate nor reproducible to enable an absolute determination of the relative percentage of the extralinear carbomethoxymethyl groups in the starting beta-carbomethoxy-alpha-aminopropionic acid polyamide which have been converted into hexamethylene - bis(carbonamidomethyl) crosslinks through reaction with the hexamethylenediamine. It is believed, however, that only a very small quantity, e. g., of the order of 1% or less, of the extralinear carbomethoxymethyl groups of the starting polyamide have been converted to hexamethylene - bis(carbonamidomethyl) crosslinks. The differences in solubilities already pointed out indicate that some of these crosslinks have been formed. Furthermore, in view of the preceding experiment described in Example VI, Part A, wherein reaction with 10.9% of the hexamethylenediamine theoretically needed to react with all the extralinear carbomethoxymethyl groups, yields a product, which, by analysis, is indicated to have 2.9% of the starting carbomethoxymethyl groups converted to hexamethylene-bis(carbonamidomethyl) crosslinks, the example, carried out under the same conditions but using only 4.36% of the amount of hexamethylenediamine theoretically needed to react with all the extralinear carbomethoxymethyl groups would yield a product wherein about 1.2% of the hexamethylene - bis(carbonamidomethyl) crosslinks have been formed.

*Part B.—Reaction of the polyamide from DL-beta - carbomethoxy - alpha - aminopropionic acid with ethylenediamine*

A solution is prepared by dissolving 2 parts of the polyamide from DL - beta - carbomethoxy-alpha - aminopropionic acid (prepared as described above in Example I, Part C and of $\eta_{inh.}=0.54$—0.56) in 59.6 parts of chloroform. A solution of 0.204 part of ethylenediamine (43.8% of the theoretical amount needed to react with all the extralinear carbomethoxy groups) in 14.7 parts of chloroform is then added. After thorough mixing the reaction mixture is poured in a thin film onto a glass plate and the chloroform solvent allowed to evaporate at room temperature. The resulting film, after being baked at 105° C. for 40 minutes, is insoluble (at steam bath temperatures) in chloroform, dimethylformamide, formic acid, m-cresol, and dichloroacetic acid—in all of which solvents the starting polyamide is soluble. Samples of the film on a copper block curl and become brittle at 250° C. and melt at 265° C. with decomposition. Samples of the film exhibit average tensile strengths of 9284 lbs./sq. in., elongations of 3.24%, pliability figures of 2.44, and an average water absorption of 14.5%. Nitrogen analysis of the insoluble copolyamide indicates it to contain 11.91% nitrogen which corresponds to the conversion of 9.5% of the original extralinear carbomethoxymethyl groups in the starting polyamide to ethylene-bis-carbonamidomethyl crosslinks.

An additional experiment carried out under the same conditions varying only in that 0.051 part of ethylenediamine is added (10.96% of the theoretical amount of ethylenediamine) produces a polyamide insoluble (at steam bath temperature) in chloroform, dimethylformamide, formic acid, dichloroacetic acid and m-cresol—in all of which solvents the starting DL-beta-carbomethoxy-alpha-aminopropionic acid polyamide is soluble. Nitrogen analysis of this copolyamide indicates it to contain 11.22% nitrogen from which it is calculated 3.3% of the extralinear carbomethoxymethyl groups have been converted to ethylene - bis - carbonamidomethyl crosslinks. Film samples of the copolyamide exhibit average tensile strengths of 10,354 lbs./sq. in., elongations of 2.9% and pliability figures of 1.76, and decomposed with gas evolution at 245° C.

EXAMPLE VII

*Preparation of a copolyamide from DL-beta-(hydroxyethylcarbamyl) - alpha - aminopropionic acid/DL-beta-carbomethoxy - alpha - aminopropionic acid*

Another two-part sample of the same polyamide from DL - beta - carbomethoxy - alpha-aminopropionic acid described in the preceding example is added portionwise over a period of two to three minutes to a solution of 10.2 parts of ethanolamine in 50 parts of water. The resulting solution is stirred for one hour at 25° C. and then allowed to stand at 25° C. for four hours. The solution is then poured in a thin film onto a glass plate and the water allowed to evaporate at room temperature. Unreacted ethanolamine is extracted with methanol from the viscous syrup which remains and the resulting product is dried at 60° C. for six hours. The hard brittle copolyamide thus obtained is insoluble in dimethylformamide and chloroform, and soluble in water, formic acid, dichloroacetic acid, and m-cresol, exhibiting an $\eta_{inh.}=0.08$ in the latter. Nitrogen analysis indicates the polyamide to contain 15.86% nitrogen. The theoretical value for the complete conversion of all the extralinear carbomethoxy groups to hydroxyethylcarbamyl groups (i. e., a polyamide of molecular formula $C_6H_{10}N_2O_3$), is 17.71% nitrogen. These results indicate the product to be a 73/27 copolyamide from DL-beta-(hydroxyethylcarbamyl) - alpha-aminopropionic acid/DL - beta - carbomethoxy-alpha-aminopropionic acid.

EXAMPLE VIII

*Preparation of a copolyamide from DL-beta-N-methylcarbamyl - alpha - aminopropionic acid/DL - beta-carbomethoxy-alpha-aminopropionic acid*

Another two-part sample of the same polyamide from DL - beta - carbomethoxy - alpha-aminopropionic acid (described in the two preceding examples) is added portionwise over a period of two to three minutes to a stirred solution of 9.3 parts of 25% aqueous methylamine in 50 parts of water. The resulting solution is stirred for one hour at 25° C., allowed to stand for five hours at this temperature, and finally poured in a thin film onto a glass plate. Water and unreacted methylamine are allowed to evaporate at room temperature. The clear, brittle copolyamide film thus obtained is insoluble in chloroform and dimethylformamide and soluble in formic acid, methanol, acetic acid and m-cresol (all at steam bath temperatures), and exhibits an $\eta_{inh.}=0.09$ in the latter. Nitrogen analysis of the copolyamide indicates it to contain 20.11% nitrogen. The theoretical value for the complete conversion of all the extralinear carbomethoxy groups to N-methylcarbamyl groups (i. e., a copolyamide of molecular formula $C_5H_8N_2O_2$), is 21.88% nitrogen. These results indicate the product to be an 84/16 copolyamide from DL-beta-N-methylcarbamyl - alpha - aminopropionic acid/DL-beta-carbomethoxy - alpha - aminopropionic acid.

EXAMPLE IX

*DL-beta-N-dodecylcarbamyl - alpha - aminopropionic acid/DL - beta - carbomethoxy-alpha-aminopropionic acid copolyamide*

A twelve-part sample of a polyamide from DL-beta - carbomethoxy-alpha-aminopropionic acid (prepared as described previously in Example I, Part C and of $\eta_{inh.}=0.56$) is heated for 37 minutes with 75 parts of dodecylamine at 105–116° C. with the methanol formed in the condensation being allowed to vaporize out of the reaction mixture as formed. The reaction mixture is cooled to room temperature and 453 parts of diethyl ether added to the resultant yellow gelatinous mass.

The solid is broken up and the suspension warmed to the boiling point of the ether and the ether then decanted from the residual material. This process is again repeated and 200 parts of distilled water then added to the remaining precipitate. The suspension is warmed to 70° C. and the product removed by filtration. After air drying, there is obtained 20.4 parts (83% yield) of copolyamide. This material is soluble in dichloroacetic acid, m-cresol, and chloroform—all at steam bath temperatures. Strong, self-supporting films can be obtained from solutions of the copolyamide in these solvents by standard film casting procedures.

Carbon analysis of samples of this material indicate the copolyamide to contain an average of 67.3% carbon. The theoretical value for complete conversion of the extralinear carbomethoxy groups to N-dodecylcarbamyl groups (i. e., a polyamide of empirical formula $C_{16}H_{30}O_2N_2$) is 68.1% carbon. The starting DL - beta - carbomethoxy-alpha-aminopropionic acid homopolyamide (i. e., a polyamide of empirical formula $C_5H_7O_3N$) contains 46.5% carbon. From these data, it is calculated that the product is a 96.8/3.2 copolyamide from DL-beta-N-dodecylcarbamyl-alpha-aminopropionic acid/DL-carbomethoxy-alpha-aminopropionic acid.

The preparation of DL-beta-carbomethoxy-alpha-aminopropionic acid and its N-carboanhydride have been given in Example I-A and I-B, respectively, with certain reaction conditions of time and temperature and proportions. However, the reaction conditions can be varied considerably and other methods may be employed. Thus, there can be employed for the preparation of the DL-beta-carboalkoxy- and carboaralkoxy-alpha-aminopropionic acids and their hydrohalide derivatives the method of Wegscheider and Frankel, Monatsh. 27, 491 (1906), which involves the reaction of DL-aspartic acid with absolute alcohol containing dry hydrogen chloride and subsequent removal of unreacted alcohol and hydrogen chloride. The product is then exactly neutralized with ammonium hydroxide and the diethyl aspartate removed by extraction with diethyl ether. A water solution of the ether extracted product is then treated with an aqueous solution of copper acetate, the mixture evaporated, and the residues triturated with cold water and the solid removed by filtration and carefully water washed. The aqueous filtrate is then treated with hydrogen sulfide and the precipitated copper sulfide removed by filtration. This filtrate in turn is concentrated and the DL-beta-carboethoxy-alpha-aminopropionic acid precipitated with alcohol and removed by filtration. Furthermore, the N-carboanhydrides of these DL - beta - carboalkoxy - alpha - aminopropionic acids can be prepared as is disclosed in U. S. Patent 2,516,145 by treating the requisite alpha-amino acid in an anhydrous solvent with an alkali metal alkoxide and with carbon dioxide thereby forming the dialkali metal salt of the alpha-carboxy-aminocarboxylic acid, reacting thionyl chloride with this salt, and finally isolating the desired N-carboanhydride.

The N-carboanhydrides of the DL-beta-carboalkoxy-alpha-aminopropionic acids can also be prepared as is disclosed in the copending applications of MacDonald filed October 7, 1947, Ser. No. 778,458, and March 24, 1949, Ser. No. 83,299, by reacting the desired alpha-amino acid or its alkali metal or alkaline earth metal salts with phosgene under anhydrous conditions. These N-carboanhydrides can also be prepared by the method disclosed in the copending application of Prichard filed October 5, 1948, Ser. No. 52,971, by reacting the amino acid or its alkali metal, alkaline earth metal or hydrohalide salts with phosgene under anhydrous conditions in the presence of an ether. This method is particularly exemplified for DL - beta - carbomethoxy-alpha-aminopropionic acid hydrochloride in Example I, Part B.

These N-carboanhydride intermediates can also be prepared from the corresponding amino acids as reported by Leuchs, Ber. 39, 857 (1906), by reacting the amino acid with a haloformate, particularly a chloroformate, ester, isolating the ester of the N-carboxyamino acid so formed, subsequently reacting this derivative with thionyl chloride under anhydrous conditions, and isolating the desired N-carboanhydride. In place of thionyl chloride in the above reaction system, there may be used other halogenating agents, such as phosgene, phosphorus pentachloride, phosphorus trichloride, phosphorus oxychloride and the like, as described in U. S. Patents 2,327,162 and 2,406,816.

This invention is generic to the alpha-amino acid polyamides containing from 2 to 100% combined alpha-carbonamido- and alpha-substituted-carbonamidomethylglycine units, i. e., beta - carbonamido- and substituted - carbonamido-alpha-aminopropionic acid units. When at least 2% of the recurring alpha-aminocarboxylic acid units of the polyamides of this invention are composed of these residues, the polyamide is capable of controllable modification in its general solubility properties, particularly in its degree of response to aqueous processing treatments through chemical modification effected through reactions with the extralinear carbonamido- and substituted-carbonamido groups, usually through the amide hydrogens of such groups.

As the proportion of combined beta-carbonamido- and substituted-carbonamido-alpha-aminopropionic acid units in the polyamides of this invention increases, there is a corresponding increase in the above-described capability of being controllably modified in properties and also in the solubility behavior of the polymers. This becomes particularly noticeable when the polymers contain a major proportion, i. e., more than 50% of the DL-beta-carbonamido- and substituted - carbonamido - alpha - aminopropionic acid units. The polyamides of this invention differ rather markedly not only as the proportion of combined beta-carbonamido- and substituted - carbonamido - alpha - aminopropionic acid units in the polyamides increases, but also as the molecular weight, or, more factually used, degree of polymerization (DP), increases. This invention, as has been pointed out previously, is generic to those polyamides containing from 2 to 100% combined beta-carbonamido- and substituted-carbonamido-alpha-aminopropionic acid units. It is also generic to these polyamides of DP varying from 10 to 20 to those of DP of 50 to 100 or higher. These polyamides obviously differ quite markedly in physical properties and, as such, are useful in many fields.

More specifically, the polyamides of this invention of low DP's of the order of 10 to 20, and generally appreciably less than 50, are useful as permanent antistatic finishes, casein replacements, thickening agents, adjuvants for electroplating baths and the like. In these uses it is generally preferred that the polymers contain major proportions, e. g., greater than 50%, of combined DL-beta-carbonamido- and substituted - DL - beta - carbonamido - alpha - aminopropionic acid units. On the other hand, for such uses as gelatin substitutes, those polymers of higher DP from 20 to 50 and preferably nearer 50 and containing again major proportions of, e. g., greater than 50%, combined DL-beta-carbonamido- and substituted-DL-beta-carbonamido-alpha-amino-propionic acid units are preferred. Another important use, wherein the polyamides of low DP, i. e., those of the order of 10 or perhaps slightly lower, are outstanding, is in the field of biologically active compositions. In this use those polyamides of this invention containing appreciable quantities, i. e., from 5 to 50% of combined DL-beta-carbonamido- and substituted-DL-beta-carbonamido-alpha-aminopropionic acid units are preferred.

On the other hand, for film and fiber use, those polyamides of this invention of the higher DP's of at least 50 and preferably higher are preferred. In such uses, the preferred combined pecentage of DL-beta-carbonamido- and substituted - DL - beta - carbonamido - alpha - aminopropionic acid units varies with the properties desired in the film or fiber. For instance, if very high degrees of water absorptions are desired, those polyamides containing relatively high proportions of combined DL-beta-carbonamido- and substituted-DL-beta-carbonamido-alpha-aminopropionic acid units are used. If moderate degrees of water absorption are desired, those polyamides of this invention containing largely minor, e. g., 2 to 10%, proportions of combined DL-beta-carbonamido- and substituted - DL - beta - carbonamido - alpha - aminopropionic acid units are used. In this connection, it should be pointed out that the variation in per cent water absorption varies linearly with per cent combined DL-beta-carbonamido- and substituted - DL - beta - carbonamido-alpha-aminopropionic acid units. On the other hand, for preparing films and fibers of vastly different solubility behavior, those polyamides of this invention containing a very small amount of combined alkylene-bis(carbonamidomethyl) links are particularly useful, i. e., those prepared from diamines.

As stated previously, the polyamides of this invention contain combined beta-carbonamido-alpha-aminopropionic acid units wherein the amide nitrogens of the extralinear carbonamido groups carry hydrogen or hydrocarbon radicals, or wherein said nitrogens are annular members of heterocycles which can contain additional heteroatoms, i. e., oxygen, nitrogen, or sulfur. A particularly preferred group of the polyamides of this invention contain combined beta-carboalkoxy- or carboaralkoxy - alpha - aminopropionic acid units in addition to the above-described beta-carbonamido- and substituted-carbonamido-alpha-aminopropionic acid units.

The most convenient way of preparing the extralinear carbonamido and substituted-carbonamido containing polyamides of this invention is to polymerize the amide-forming derivatives, particularly the N-carboanhydrides, of the desired esterified beta-carboxy and particularly the beta-carboalkoxy-alpha-aminopropionic acids either alone or with the amide-forming derivatives, again particularly the N-carboanhydrides, of other alpha-aminocarboxylic acids. The polyamide or copolyamide thereby obtained is then reacted with the desired primary or secondary amine or ammonia until the required aount of extralinear carboalkoxymethyl groups are converted to the desired carbonamido- or substituted-carbonamidomethyl groups. Reaction with amino-hydrogen-containing amines is preferred. It is necessary that about 1% of these extralinear carboalkoxymethyl groups be so converted in order that the final polyamide will have properties different from the starting polyamide containing extralinear carboalkoxymethyl groups.

Examples of the primary and secondary mono- or diamines which can be used in reaction with the preformed DL - beta - carboalkoxymethyl-alpha-aminopropionic acid polymers to form the polyamides of this invention are amino-hydrogen-containing amines, e. g., primary aliphatic amines, e. g., methylamine, ethylamine, amylamine, dodecylamine; secondary aliphatic amines, e. g., dimethylamine, diamylamine, ethylpropylamine; primary aromatic amines, e. g., beta-naphthylamine and p-methylaniline; secondary aromatic amines, e. g., diphenylamine, N-ethylaniline, N-butylaniline; primary aliphatic-aromatic amines, e. g., 2-phenylethylamine, 3-phenylpropylamine; secondary aliphatic-aromatic amines, e. g., di-2-phenylethylamine and ethyl-2-phenylethylamine; substituted primary aliphatic amines, e. g., 2-chloroethylamine, 3-nitropropylamine, 4-ethoxybutylamine, 1-phenoxy-6-aminohexane; substituted secondary aliphatic amines, e. g., N-2-chloroethylethylamine, N - methyl - 3 - nitropropylamine, N - methyl-2-phenoxyethylamine, N-ethyl - 2 - methoxyethylamine; substituted primary aromatic amines, e. g., 4-nitroaniline, 3-chloroaniline, 2-ethylaniline, 4-ethoxy-2-chloroaniline, 3,5-diethylaniline, 4-aminodiphenyl ether; substituted secondary aromatic amines, e. g., N-methyl-p-chloroaniline, N-phenyl-p-nitroaniline, N-ethyl-p-phenetidine; substituted primary aliphatic-aromatic amines, e. g., 2-(4-chlorophenyl)ethylamine, 3-(3-nitrophenyl)propylamine; substituted secondary aliphatic aromatic amines, e. g., N-methyl-2-(4-chlorophenyl)ethylamine, N-ethyl-3-(4-ethoxyphenyl)propylamine; primary cycloaliphatic amines, e. g., cyclohexylamine and 2-aminodecahydronaphthalene; secondary cycloaliphatic amines, e. g., dicyclohexylamine and N-methylcyclohexylamine; substituted primary cycloaliphatic amines, e. g., 4-nitrocyclohexylamine, 3-chlorocyclohexylamine; substituted secondary cycloaliphatic amines, e. g., N-methyl-4-chlorocyclohexylamine, N - ethyl-4-ethoxycyclohexylamine; polyamines, e. g., ethylenediamine, hexamethylenediamine, N,N'-diethylethylenediamine, p-phenylenediamine, N-2-chloroethyl-N'-ethylethylenediamine, 1,2,3-benzenetriamine, triethylenetetramine; cyclic amines, e. g., piperidine, piperazine, 2,5-dimethylpiperazine, morpholine; heterocyclic amines, e. g., alpha-aminothiophene, 2-aminothiazole, 2-amino-4-methylthiazole, and 2-aminopyridine; hydroxy-containing amines, e. g., 2-hydroxyethylamine, 4-hydroxymethylaniline; mercapto-containing amines, e. g., 2-mercaptoethylamine, 4 - (2 - mercaptoethyl)-2-methylaniline; phenolic amines, e. g., 4-hydroxyaniline, 2-(4 - hydroxyphenyl)ethylamine; hydrazines, e. g., hydrazine, 2-propylhydrazine; guanidines, e. g., guanidine, N-phenylguanidine; biguanides, e. g., biguanide, N-phenylbiguanide. In the case of the above-mentioned diamines.

the resultant polyamide will, of course, be crosslinked to the extent that the respective diamine reacts under the conditions used—said crosslinks consisting of the diamine fragment bonding two extralinear carbonamido groups. These crosslinked compositions are of particular interest in fiber outlets.

Because of their greater reactivity, aliphatic, i. e., nonaromatic, amines, both mono- and diamines, are preferred. In the case of the aromatic amines, since amidation is relatively difficult to accomplish, rather vigorous reaction conditions are preferably employed. Because of the undesirable side reactions encountered when relatively high reaction temperatures are employed, it is preferred to carry out the amidation with aromatic amines using sodamide or other strongly basic metal ammonia or metal amine compounds and the desired aromatic amine in the manner of Jacobson, J. Am. Chem. Soc., 67, 1998 (1945).

As has been stated previously, the polyamides of this invention can be conveniently prepared by polymerizing the amide-forming derivatives, preferably the N-carboanhydrides, of beta-carboalkoxy- and carboaralkoxy-alpha-aminopropionic acids, either alone or with the amide-forming derivatives (again preferably the N-carboanhydrides) of other alpha-aminocarboxylic acids, preferably alpha-monoamino-monocarboxylic acids, and to react the thus formed polymer with ammonia or the requisite primary or secondary amine needed to convert the extralinear carboalkoxy groups to the desired carbonamido or substituted carbonamido groups. The amide-forming derivatives of any beta-carboalkoxy-alpha-aminopropionic acid can be used. As illustrated in Example I, Part A, these beta-carboalkoxy-alpha-aminopropionic acids can be conveniently prepared by methods known in the art.

While the linear polyamides, having extralinear carbonamide substituents, of this invention may be made from linear polyamides having extralinear carboaralkoxy, e. g., carbobenzyloxy, substituents, the greater reactivity of the linear polyamides having extralinear carboxyl groups esterified with lower alkanols, i. e., of one to four carbons, is such as to render these latter the really practical polymer raw materials for the present invention although the invention is generic to the preparation of polyamides having extralinear carbonamide substituents and their preparation from linear polyamides having extralinear carboxyls esterified by monohydric alcohols hydrocarbon except for the alcoholic hydroxyl. Because of superior reactivity with ammonia and primary and secondary amines in forming the side chain carbonamido and substituted carbonamido groups, DL-beta-carbomethoxy-alpha-aminopropionic acid is especially preferred.

Although, as has been stated previously, this invention is generic to the alpha-amino acid polyamides containing from about 1 to 2 to 100% combined alpha-carbonamido- and substituted-carbonamido-alpha-aminopropionic acid units, the preferred polyamides are those containing from about 1 to 2 to 100% substituted-carbonamido-alpha-aminopropionic acid units, i. e., alpha-amino acid polyamides containing from about 1 to 2 to 100% combined beta-carbonamido-alpha-aminopropionic acid units, wherein the amide nitrogens of the extralinear carbonamido groups carry hydrocarbon radicals or at most one hydrogen, or wherein said nitrogens are annular members of heterocycles which can contain additional heteroatoms, i. e., oxygen, nitrogen, or sulfur. These polyamides, i. e., those containing extralinear substituted carbonamido groups, are much preferred over those containing the extralinear carbonamido, i. e., carbamyl groups, because the former exhibit generally better organic solvent solubility in a wider range of solvents. This solubility difference becomes more particularly pronounced as the percentage of combined beta-carbonamido- and substituted-carbonamido-alpha-aminopropionic acid units in the polyamides increases and also with increasing carbon content of the radicals bonded to the amide nitrogens in the extralinear carbonamido groups.

As has been pointed out in Example I, Part D, representative polymers of this invention containing appreciable proportions of combined beta-carbamyl-alpha-aminopropionic acid units are soluble only in water and strong organic acids, e. g., formic and dichloroacetic acids and insoluble in a wide variety of organic solvents. From the point of view of convenience and the desirability of handling, the strong organic acids are not desirable solvents, to say nothing of the quality and cost of the equipment needed to handle them. Furthermore, as also indicated in this example, water solutions, which would, of course, be acceptable from the solvent standpoint, are extremely viscous—thus making it difficult to carry out normal film casting and fiber spinning procedures.

On the other hand, as pointed out in the other examples, those polymers of this invention wherein the extralinear carbonamido groups carry one or two alkyl or cycloalkyl hydrocarbon radicals on the amido nitrogens are soluble in a wide variety of the common organic solvents and exhibit normal viscosities in such solvents. Solutions of these polyamides in such solvents can be readily and conveniently used in normal film casting and fiber spinning procedures.

In the case of copolymers containing the combined residues of other alpha-aminocarboxylic acids there are, of course, additional units in the polymer chain other than the combined DL-beta-carboalkoxy-alpha-aminopropionic acid units and DL-beta-carbonamido or substituted-carbonamido-alpha-aminopropionic acid units. However, upon hydrolysis with hydrochloric acid, the polyamides of this invention yield alpha-amino-carboxylic acid hydrochlorides at least 2% and preferably 5% of which is DL-beta-carboxy-alpha-aminopropionic acid hydrochloride, due to concomitant hydrolysis of the lateral carbonamido groups.

Alpha-monoaminomonocarboxylic acid N-carboanhydrides in general can be copolymerized with the DL-beta-carboalkoxy-alpha-aminopropionic acid N-carboanhydrides to form copolyamides which can be converted into the copolyamides of this invention by reaction with ammonia or a primary or secondary amine, including, for example, alpha-primary-monoaminoalkanoic acids, e. g., glycine, alanine, leucine, isoleucine, pseudoleucine, norleucine, valine, norvaline, alpha-amino-n-butyric acid, alpha-methyl-alpha-amino-n-butyric acid, alpha-amino-n-heptanoic acid, alpha-amino-n-octanoic acid, alpha-amino-lauric acid, alpha-amino-myristic acid, alpha-aminoisobutyric acid, alpha-aminodiethylacetic acid, alpha-aminoisoamyl-acetic acid, 2-amino-4,6,6-trimethylheptanoic acid; cycloaliphatic-alpha-primary-monoamino-monocarboxylic acids, e. g., 1-amino-cyclopentanecarboxylic acid, 1-aminocyclohexanecarboxylic acid, 1 - aminocycloheptanecarboxylic acid; aromatic - substituted, aliphatic - alpha-monoaminomonocarboxylic acids, e. g., beta-phenylalanine, alpha-phenylglycine, and beta-(m-tolyl)alanine; cycloaliphatic-substituted-aliphatic-alpha-monoaminomonocarboxylic acids, e. g., alpha-aminocyclohexylacetic acid; N-aryl-substituted - alpha-secondary-monoaminomono-carboxylic acids, e. g., N-phenylglycine, N-o-tolylglycine; N-alkyl-substituted-alpha-secondary-monoaminomonocarboxylic acids, e. g., N-methylglycine, N-isopropylglycine, N-butylglycine, N-octadecylglycine, N-isopropylleucine, N-methylalanine.

The polyamides and copolyamides of this invention are prepared optionally in the presence of organic liquids by the condensation polymerization (thermal or initiated by water, alcohols, phenols, organic acids, or amino-hydrogen-containing amines) of the previously defined mono-aminomonocarboxylic acid N-carboanhydrides with carbon dioxide evolution. Suitable organic liquids that can be used include aromatic hydrocarbons, e. g., benzene, xylene; halogenated hydrocarbons, e. g., chloroform, chlorobenzene, tetrachloroethane, carbon tetrachloride; alicyclic ketones, e. g., cyclohexanone; hydrocarbon ethers, e. g., anisole and dibutyl ether.

The N-carboanhydrides are suitably heated in a vessel adapted to permit the escaping of carbon dioxide to that temperature at which carbon dioxide begins to be evolved at an appreciable rate under the conditions of reaction. This varies with different amino acids, but it is usually in the range from 25 to 200° C. and generally within 30-50° C. of the melting point of the lowest melting N-carboanhydride present in the mixture to be polymerized. The time of the reaction can be shortened or the temperature can be lowered or both can be accomplished by the use of reaction initiators, e. g., water, alcohols, phenols, and selected organic acids or amino-hydrogen-containing amines—the latter two as disclosed in the copending applications of MacDonald, Ser. Nos. 778,031 and 778,032, filed October 4, 1947.

The reaction of the intermediate alpha-amino acid polyamides and copolyamides containing extralinear esterified carboxyl groups, e. g., carboalkoxymethyl groups, with the primary and secondary mono- or diamines previously discussed to form the polyamides and copolyamides of this invention containing at least 2 and preferably at least 5% extralinear carbonamido- and substituted-carbonamidomethyl groups can be carried out under a wide variety of conditions. For instance, the amine reactant may be used in sufficient excess quantities to serve as a solvent or suspension agent for the polyamide or copolyamide being reacted. Inert organic liquids may be used as reaction media. Of these it is preferred to use those which are solvents for the intermediate carboalkoxymethyl-containing polyamides and copolyamides. Particular examples of such solvents are water, halogenated hydrocarbons such as chloroform, carbon tetrachloride, tetrachloroethane, and chlorobenzene; aromatic hydrocarbons such as benzene, toluene and the xylenes.

The reaction may be carried out under superpressures which is preferably done in those cases where the amine reactants are normally gaseous. The reaction temperatures may vary from —78° C. to +150° C. depending in general on the reactivity and physical constants of the amine reactants involved. For instance, if the amine is one which is normally gaseous, then the reaction temperatures used are preferably in the lowest possible range commensurate with appreciable reaction. On the other hand, if the amine reactants are relatively high boiling—preferably liquids—the reaction temperatures may be conveniently those at which the amine reactant boils under normal conditions, i. e., the reaction is carried out at the reflux. In the case of those amine reactants whose normal boiling points are intermediate between room temperature and 70–100° C., as well as those amine reactants normally above 150° C., the reaction is usually carried out using an inert organic solvent and usually in the range of 25 to 100° C.

The time of reaction may vary from as little as five to ten minutes to as long as is desired. For minimum conversion of the amount of extralinear carboalkoxymethyl groups in the intermediate polyamides and copolyamides to engender the necessary difference in properties in the end product extralinear carbonamido- and substituted-carbonamidomethyl-containing polyamides, it is usually necessary that the reaction be carried out for at least 30 to 60 minutes. Obviously as the time of reaction increases, the amount of amidation likewise increases.

The polyamides and copolyamides of this invention, i. e., those containing a plurality of combined beta-carbonamido-alpha-aminopropionic acid units can be prepared directly in situ in the desired form, e. g., films or fibers. This is most conveniently done by forming the preferred intermediate beta-carboalkoxy-alpha-aminopropionic acid polymer directly in the presence of ammonia or the desired primary or secondary amine and subsequently carrying out the desired conversion of the extralinear carboalkoxy groups to the required carbonamido and substituted carbonamido groups. This is particularly applicable in the case of fibers especially for the crosslinked fibers obtained by using diprimary or disecondary diamines.

More specifically, the desired polyamide containing a plurality of combined beta-carboalkoxy-alpha-aminopropionic acid units (easily prepared and in high molecular weight as discussed previously and serving as an intermediate in the preferred route to the polyamides of this invention) is formed into fibers, i. e., spun into a coagulating bath, e. g., water or methanol, and then passed through a bath containing a solution of the desired diamine, e. g., hexamethylenediamine with the diamine bath maintained at sufficiently high temperature, e. g., from 80 to 120° C., and with the fiber throughput at such a speed that the fiber is maintained in this diamine bath at the reaction temperature for from 10 to 60 minutes. The thus formed crosslinked fiber after washing and normal yarn processing produces fibers possessing a plurality of hexamethylene - bis - carbonamidomethyl crosslinks. The same results may be achieved by forming the beta-carboalkoxy-alpha-aminopropionic acid polyamide directly in fiber form in a coagulating bath containing the desired diamine and maintaining the fiber in the bath for a sufficient time to carry out the desired crosslinking reaction. Similarly, the desired fiber can be prepared by forming the starting beta-carboalkoxy-alpha-aminopropionic acid polyamide into fiber form in an alcohol or water coagulating bath, soaking the thus formed fiber in a solution of the desired diamine and subsequently heating the thus formed fiber at temperatures of 80–120° C. for a sufficient time to engender the crosslinking reaction.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An optically inactive copolyamide of degree of polymerization of at least 50, the recurring units of which consist essentially of DL-beta-carbomethoxy-alpha-aminopropionic acid units and DL-beta-carbonamido-alpha-aminopropionic acid units wherein the valences of the extralinear carbonamido nitrogen not bonded to the carbonyl group are bonded to radicals forming, together with NH, an organic amine.

2. An optically inactive copolyamide of degree of polymerization of at least 50, the recurring units of which consist essentially of DL-beta-carbomethoxy-alpha-aminopropionic acid units and DL - beta - carbonamido - alpha-aminopropionic acid units wherein the valences of the extralinear carbonamido nitrogen not bonded to the carbonyl group are bonded to hydrocarbon radicals.

3. An optically inactive copolyamide of degree of polymerization of at least 50, the recurring units of which consist essentially of DL-beta-carbomethoxy-alpha-aminopropionic acid units and DL-beta-carbonamido-alpha-aminopropionic acid units wherein the extralinear carbonamido nitrogen is an annular member of a heterocyclic ring.

4. An optically inactive polyamide of degree of polymerization of at least 10, the recurring units of which are alpha-monoaminomonocarboxylic acid units from 1 to 100% of which are DL - beta - carbonamido - alpha-aminopropionic acid units wherein the valences of the extralinear carbonamido nitrogen not bonded to the carbonyl group are bonded to radicals of the class consisting of hydrogen, hydrocarbon radicals and radicals which, together with said amido nitrogen form a heterocyclic ring.

5. An optically inactive polyamide of degree of polymerization of at least 10, the recurring units of which are alpha-monoaminomonocarboxylic acid units from 1 to 100% of which are DL-beta-carbonamido-alpha-aminopropionic acid units wherein the valences of the extralinear carbonamido nitrogen not bonded to the carbonyl group are bonded to radicals forming together with NH an organic amine.

6. Process for the preparation of optically inactive polyamides, the recurring units of which are alpha-monoaminomonocarboxylic acid units from 1 to 100% of which are beta-carbonamido-alpha-aminopropionic acid units which comprises bringing an optically inactive polyamide of degree of polymerization of at least 10, the recurring units of which are alpha-monoaminomonocarboxylic acid units from 2 to 100% of which are beta-carbomethoxy-alpha-aminopropionic acid units in contact with a nitrogen compound of the class consisting of ammonia and primary and secondary amines until at least 1% of the carbomethoxy groups are converted to carbonamido groups.

7. Process for the preparation of optically inactive polyamides, the recurring units of which are alpha-monoaminomonocarboxylic acid units from 1 to 100% of which are beta-carbonamido-alpha-aminopropionic acid units which comprises bringing an optically inactive polyamide of degree of polymerization of at least 10, the recurring units of which are alpha-monoaminomonocarboxylic acid units from 2 to 100% of which are beta - carboalkoxy - alpha - aminopropionic acid units in contact with a nitrogen compound of the class consisting of ammonia and primary and secondary amines until at least 1% of the carboalkoxy groups are converted to carbonamido groups.

8. Process for the preparation of optically inactive polyamides, the recurring units of which are alpha-monoaminomonocarboxylic acid units from 50 to 100% of which are beta-carbonamido-alpha-aminopropionic acid units which comprises bringing an optically inactive polyamide of degree of polymerization of at least 10, the recurring units of which are beta-carboalkoxy-alpha-aminopropionic acid units wherein the alkyl of the carboalkoxy group is from one to six carbons, in contact with a nitrogen compound of the class consisting of ammonia and primary and secondary amines until at least 1% of the carboalkoxy groups are converted to carbonamido groups.

9. Process for the preparation of optically inactive polyamides, the recurring units of which are alpha-monoaminomonocarboxylic acid units from 50 to 100% of which are beta-carbonamido-alpha-aminopropionic acid units which comprises bringing an optically inactive polyamide of degree of polymerization of at least 10, the recurring units of which are beta-esterified carboxyl-alpha-aminopropionic acid units, in contact with a nitrogen compound of the class consisting of ammonia and primary and secondary amines until at least 1% of the esterified carboxyl groups are converted to carbonamido groups.

10. Process for the preparation of optically inactive polyamides, the recurring units of which are alpha-monoaminomonocarboxylic acid units comprising beta-carbonamido-alpha-aminopropionic acid units which comprises bringing an optically inactive polyamide of degree of polymerization of at least 10, the recurring units of which are alpha-monoaminomonocarboxylic acid units from 2 to 100% of which are beta-carbomethoxy-alpha-aminopropionic acid units in contact with a nitrogen compound of the class consisting of ammonia and primary and secondary amines and continuing the treatment until the solubility properties of the initial polyamide are substantially changed by conversion of carbomethoxy units to at least 1% of the carbonamido units.

11. Process of claim 10 wherein the nitrogen compound is a primary amine.

12. Process of claim 10 wherein the nitrogen compound is a diprimary diamine.

13. Process of claim 10 wherein the nitrogen compound is a primary monoamine.

14. Process of claim 10 wherein the nitrogen compound is a secondary amine.

15. An optically inactive copolyamide of degree of polymerization of at least 50, the recurring units of which consist essentially of DL-beta-carbomethoxy-alpha-aminopropionic acid units and DL-beta-carbonamido-alpha-aminopropionic acid units wherein the valences of the extralinear carbonamido nitrogen not bonded to the carbonyl group are bonded to radicals forming, together with NH, a primary amine.

16. An optically inactive polyamide of degree of polymerization of at least 50, the recurring units of which are alpha-monoaminomonocarboxylic acid units from 1 to 100% of which are DL-beta-carbonamido - alpha - aminopropionic acid units wherein the valences of the extralinear carbonamido nitrogen not bonded to the carbonyl group are bonded to hydrogen.

17. An optically inactive polyamide of degree of polymerization of at least 50, the recurring units of which are alpha-monoaminomonocarboxylic acid units from 1 to 100% of which are DL-beta-carbonamido - alpha - aminopropionic acid units wherein the valences of the extralinear carbonamido nitrogen not bonded to the carbonyl group are bonded to radicals forming, together with NH, an organic amine.

18. An optically inactive polyamide of degree of polymerization of at least 50, the recurring units of which are alpha-monoaminomonocarboxylic acid units the major proportion of which are DL-beta - carbonamido - alpha - aminopropionic acid units wherein the valences of the extralinear carbonamido nitrogen not bonded to the carbonyl group are bonded to hydrogen.

19. An optically inactive polyamide of degree of polymerization of at least 50, the recurring units of which are alpha-monoaminomonocarboxylic acid units the major proportion of which are DL-beta-carbonamido-alpha-aminopropionic acid units wherein the valences of the extralinear carbonamido nitrogen not bonded to the carbonyl group are bonded to radicals forming, together with NH, an organic amine.

20. An optically inactive copolyamide of degree of polymerization of at least 50, the recurring units of which consist essentially of DL-beta - carboalkoxy - alpha - aminopropionic acid units and DL-beta-carbonamido-alpha-aminopropionic acid units wherein the valences of the extralinear carbonamido nitrogen not bonded to the carbonyl group are bonded to hydrogen.

21. An optically inactive copolyamide of degree of polymerization of at least 50, the recurring units of which consist essentially of DL-beta - carboalkoxy - alpha - aminopropionic acid units and DL-beta-carbonamido-alpha-aminopropionic acid units wherein the valences of the extralinear carbonamido nitrogen not bonded to the carbonyl group are bonded to radicals forming, together with NH, an organic amine.

22. An optically inactive copolyamide of degree of polymerization of at least 50, the recurring units of which consist essentially of DL - beta - carbomethoxy-alpha-aminopropionic acid units and, in major proportion, DL-beta-carbonamido-alpha-aminopropionic acid units wherein the valences of the extralinear carbonamido nitrogen not bonded to the carbonyl group are bonded to hydrogen.

23. An optically inactive copolyamide of degree of polymerization of at least 50, the recurring units of which consist essentially of DL - beta - carbomethoxy-alpha-aminopropionic acid units and, in major proportion, DL-beta-carbonamido-alpha-aminopropionic acid units wherein the valences of the extralinear carbonamido nitrogen not bonded to the carbonyl group are bonded to radicals forming, together with NH, an organic amine.

24. Process for the preparation of optically inactive polyamides, the recurring units of which are alpha-monoaminomonocarboxylic acid units from 50 to 100% of which are beta-carbonamido-alpha-aminopropionic acid units which comprises bringing an optically inactive polyamide of degree of polymerization of at least 10, the recurring units of which are beta-esterified carboxyl-alpha-aminopropionic acid units, in contact, dispersed in an inert organic liquid, with a nitrogen compound of the class consisting of ammonia and primary and secondary amines until at least 1% of the esterified carboxyl groups are converted to carbonamido groups.

MAYNARD S. RAASCH.
CHARLES W. TULLOCK.

References Cited in the file of this patent

Fraenkel-Conrat et al.: Journal American Chemical Society, vol. 67, pages 950 to 954, 1945.

Frankel et al.: Nature, vol. 163, pages 213, 214, February 5, 1949.

Fischer et al.: Berichte der Deutsche Chemische Gesellschaft, vol. 40, 1907, pages 2048, 2049, 2057, 2058, 2060, 2061.

Bergmann et al.: Berichte der Deutsche Chemische Gesellschaft, vol. 66, pages 1288, 1289, 1933.